Jan. 19, 1926. Re. 16,255

F. JAGER

CAR DOOR

Original Filed Sept. 4, 1919 4 Sheets-Sheet 1

Inventor
Frank Jager
By Chas. F. Wilson Atty

Jan. 19, 1926. Re. 16,255

F. JAGER

CAR DOOR

Original Filed Sept. 4, 1919 4 Sheets-Sheet 2

Inventor
By Frank Jager
Ira J. Wilson Atty.

Jan. 19, 1926. Re. 16,255
F. JAGER
CAR DOOR
Original Filed Sept. 4, 1919 4 Sheets-Sheet 3
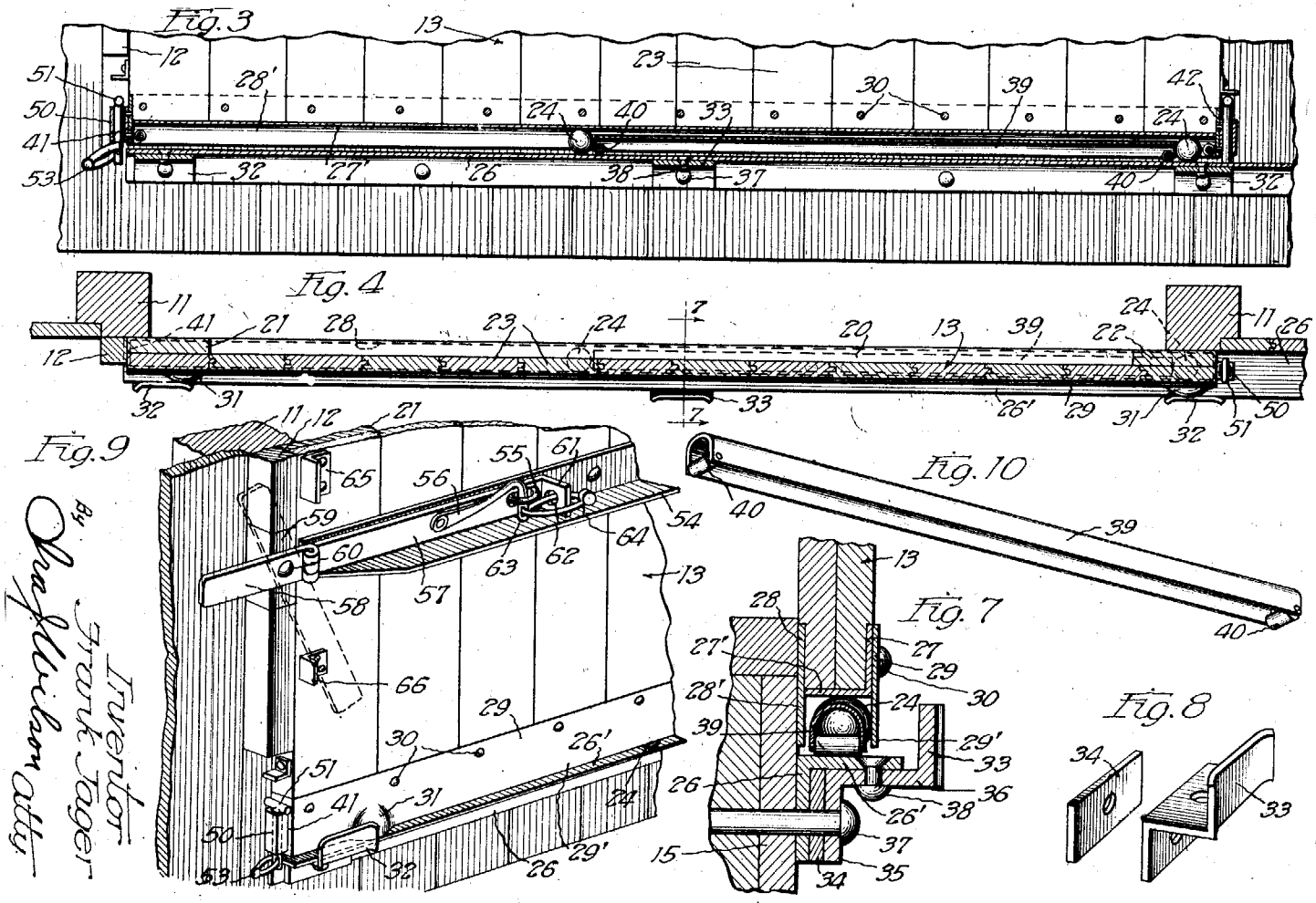
Inventor
Frank Jager
By Ira J. Wilson Atty.

Jan. 19, 1926. Re. 16,255

F. JAGER

CAR DOOR

Original Filed Sept. 4, 1919 4 Sheets-Sheet 4

Inventor
Frank Jager
By Chas. J. Wilson
Atty.

Reissued Jan. 19, 1926. Re. 16,255

UNITED STATES PATENT OFFICE.

FRANK JAGER, OF CHICAGO, ILLINOIS, ASSIGNOR OF ONE-HALF TO SAMUEL A. SPRY, OF CHICAGO, ILLINOIS; ELIZABETH J. SPRY ADMINISTRATRIX OF SAID SAMUEL A. SPRY, DECEASED.

CAR DOOR.

Original No. 1,427,901, dated September 5, 1922, Serial No. 321,619, filed September 4, 1919. Application for reissue filed September 9, 1924. Serial No. 736,719½.

*To all whom it may concern:*

Be it known that I, FRANK JAGER, a citizen of the United States, and residing at Chicago, county of Cook, and State of Illinois, have invented certain new and useful Improvements in Car Doors, of which the following is a description, reference being had to the accompanying drawings, forming a part of this specification.

My present invention relates to doors for railway freight cars and other structures, and has reference more particularly to an outside door of the type designed, for movement longitudinally of the car to open and close the doorway opening, one object of the invention being to provide improved means whereby the door may have easy movement in the opening and closing of the same, and this without binding or sticking in or against the tracks. In the present instance, such improved means takes the form of antifrictional elements interposed in a spaced and housed relation between the bottom edge of the door and the track or rail which ultimately carries the weight of the door, and it is an object of this invention to provide a track or rail open at its outer side to prevent accumulation of foreign matter thereon, and which is so arranged with reference to the doorway frame as to eliminate any bending of the rail heretofore due to teams backing up toward the doorway and impacting against the rail, and at the same time the latter is also constructed to serve as a stiffening member for the doorway frame.

A further object is the provision of improved means designed to automatically maintain the door in its open and closed positions, and thereby prevent involuntary movement of the same incident to abrupt car movement.

A further object of the invention is to provide improved means whereby the door, when closed, is held tightly against the doorway frame whereby to exclude the entrance of water, snow, and dirt into the car, and to render it burglar-proof.

Light weight, economy in construction, and the utilization of commercial metal shapes to the fullest extent in the manufacture of the door are still further objects of this invention.

The invention further contemplates the provision of certain novel details of construction, combination and arrangement of parts of the improved door, whereby to improve the construction and increase the efficiency and utility of doors of this type. It also contemplates the provision of an improved locking and sealing means adapted to assist in the final closing and in the initial opening movements of the door.

These, together with such other objects and advantages as may hereinafter be set forth, or are incident to my invention, I attain by means of a construction illustrated in preferred form in the accompanying drawings, wherein:

Figures 3 and 4 are respectively longitudinal sectional views taken in vertical and horizontal planes in the vicinity of the bottom of the door and its track;

Figure 7 represents a detailed sectional view of the bottom portion of the door taken along the line 7—7 of Figure 4;

Figure 8 is a view in perspective of the bracket illustrated in Figure 7;

Figure 9 is a perspective view of a fragmentary portion of the door, illustrating means for locking and sealing the door; and, Figure 10 is a view in perspective of the spacing member for the anti-friction elements.

Figure 1:
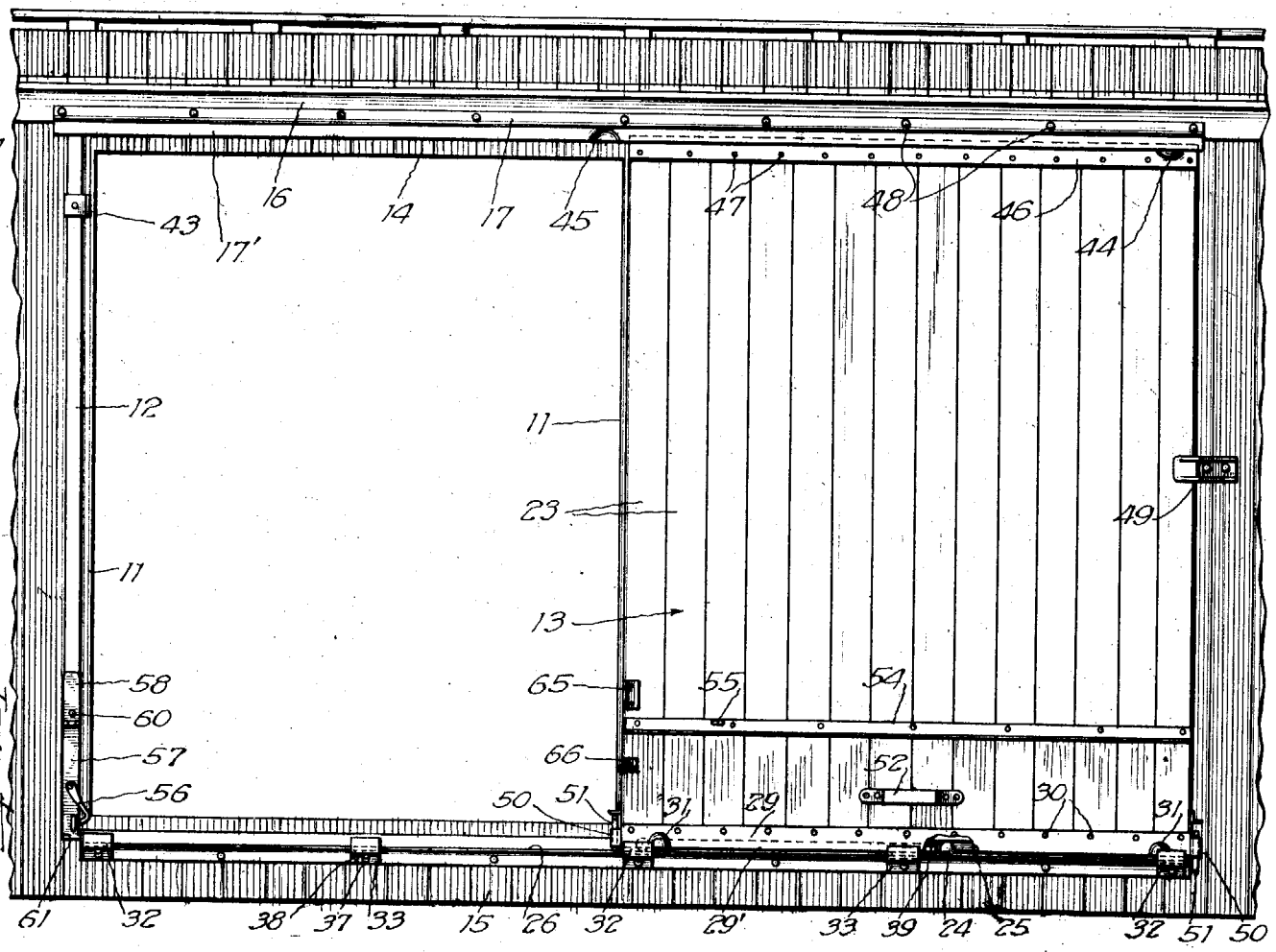
Figure 1 is a front elevation of a fragmentary portion of the car siding to which my improved door is shown as applied, the door being illustrated in its open position.
Figure 2:
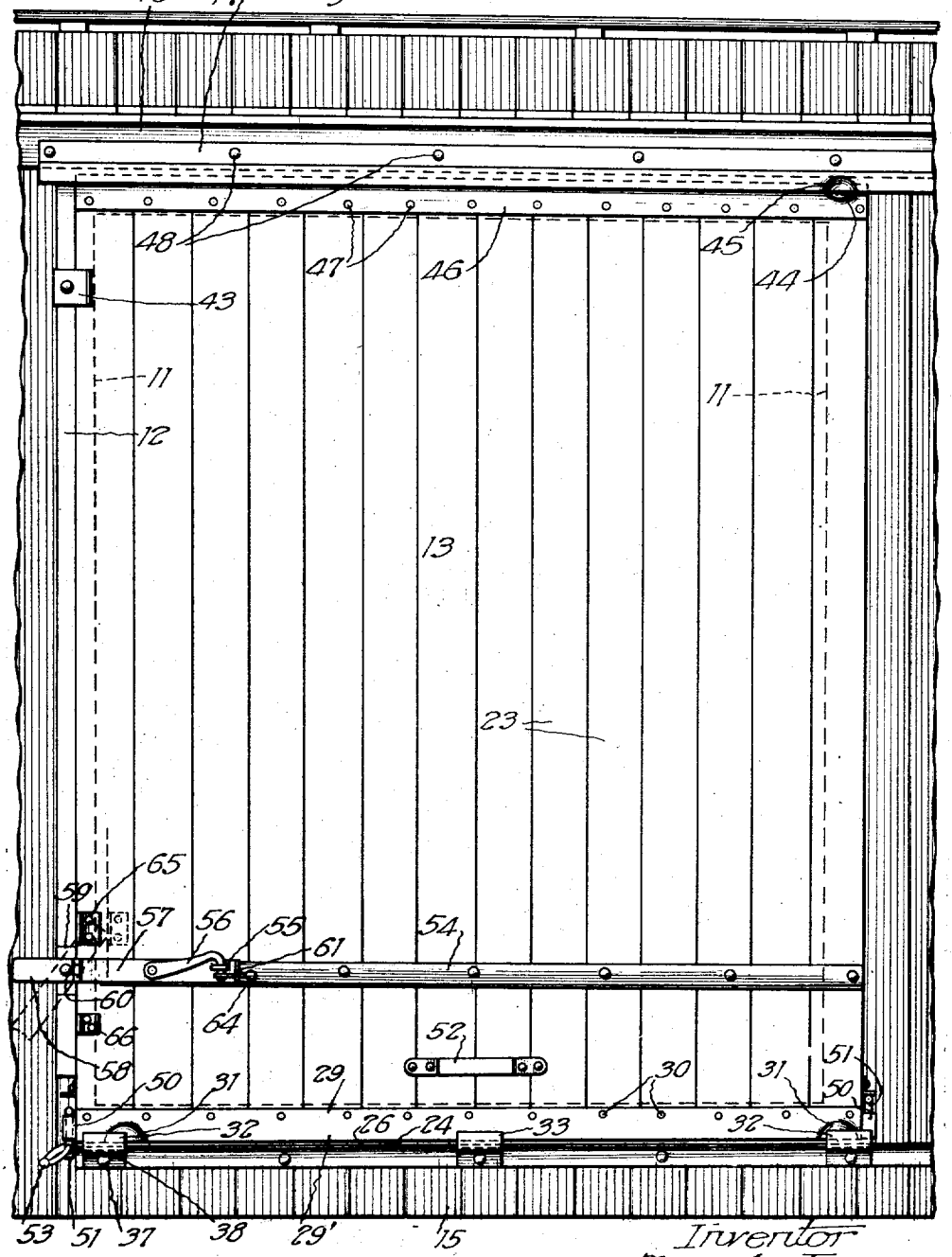
Figure 2 is a similar view of the door when closed.
Figure 5:
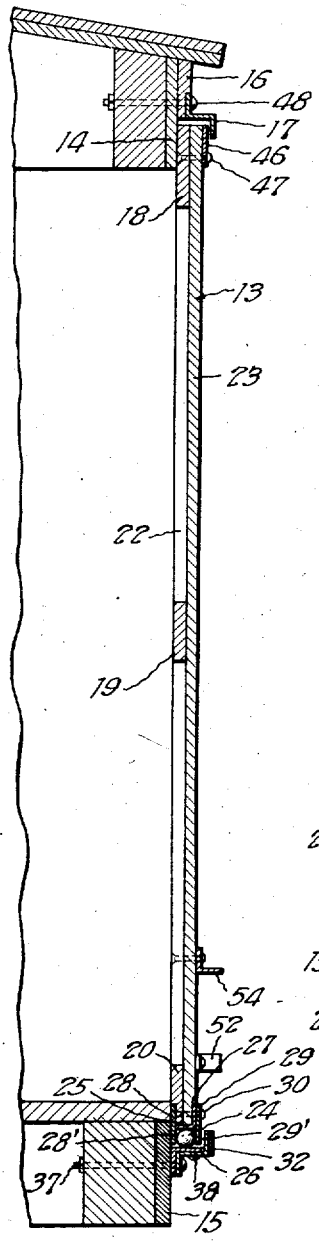
Figure 5 represents a transverse vertical view in cross-section taken centrally through the door when closed.

Referring to the drawings, the reference character 11 denotes the door-posts at each side of the doorway opening, the left-hand one of which is preferably provided with a door stop 12 against which the front edge of the door 13 abuts when the latter is moved in its closed position, as more clearly shown in Figures 2, 3, 4, and 9. The members 11 and 12, together with the upper and lower doorway frame portions 14 and 15, respectively, constitute the doorway opening. This upper frame portion 14 may include as a part thereof a fascia plate 16 which may be provided with any suitable upper rail, such as the Z-bar 17, adapted for positioning and maintaining the upper edge of the door against outward displacement.

The door 13 may be fabricated from wood or metal sheets, as desired, and in the present instance the outer sheathing 23 is braced or reinforced by the horizontal inner frame members 18, 19 and 20 and the vertical front and rear inner frame members 21 and 22, as in the manner shown. It is intended that the weight of the door shall be supported and the door given maximum ease in traveling movement through the medium of anti-friction balls 24 which are interposed in the housing 25 between the lower portion of the door and the lower track or rail 26.

In the preferred construction of the housing 25 and track 26, together with that of the brackets and other parts hereinafter set forth and described, it is my aim to utilize in an economical fashion commercial shaped iron for this purpose, and thus obviate the employment of unusual or specially fabricated shapes or castings. In this way I reduce the element of cost of manufacture and maintenance to the minimum, while maintaining the factors of strength and rigidity at the maximum. The matter of repair or replacement is also facilitated and made possible of ready accomplishment by the most unskilled labor. These named parts are furthermore arranged so as to in turn reinforce or strengthen the door and doorway frame at vital points.

The housing 25 in effect is constructed to present an inverted channel contour, open at the bottom so as to receive and house the anti-friction elements 24, and comprises the intermediate angle-bar 27 and the inner and outer metal plates or bars 28 and 29, all of which are associated together and secured to the bottom edge of the door by means of the securing elements 30, and in such a manner that the horizontal leg or flange 27′ of the angle-bar 27 acts to serve as an upper runway for the balls, while the depending lower portions 28′ and 29′ of the plates 28 and 29 serve as ball retainers and are spaced apart to permit slight lateral movement of the balls when the door is forced inwardly against the frame in its final closing movement.

Figure 6:
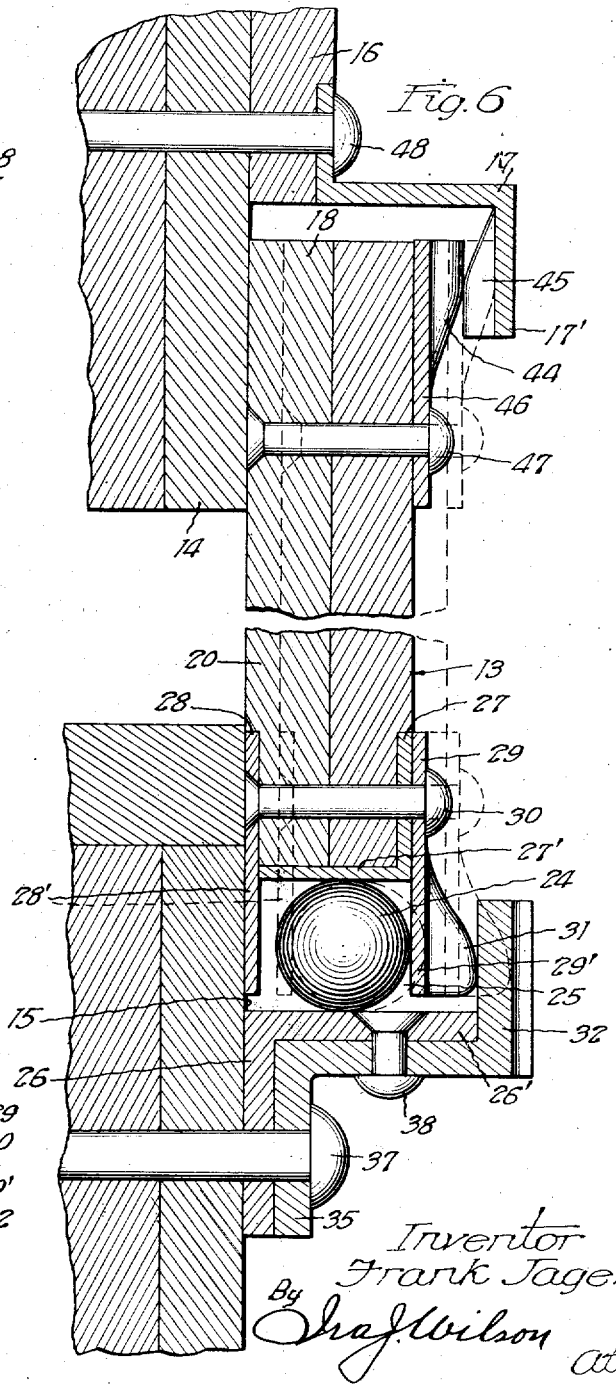
Figure 6 is a detailed transverse vertical sectional view.

This inward movement of the door is indicated in Figure 6 of the drawings, the dotted lines denoting the position of the door during the major portion of its travel, and the full lines its ultimate tightly closed position against the doorway frame. To achieve this function, the outer ball retaining bar is dished, outwardly, near its ends, to form cams 31, which have a camming action with the inner and outer Z-bar brackets 32 in the final closing and opening movement of the door. The intermediate brackets 33 are, through the employment of filler plates or blocks 34, positioned slightly outwardly in advance of the other bracket 32 in order to avoid contact with the cams 31 during door movement (Figure 4). As will be seen from an inspection of Figures 6 and 7, the lower vertical flanges 35 and the horizontal flanges 36 of the brackets are secured to the vertical and horizontal flanges, respectively, of the angle-bar rail 26 by means of the headed bolt members 37 and the rivets 38, the members 37 passing into the doorway frame, and in the case of the brackets 33, through the filler blocks 34.

The horizontal flange 26′ of the angle-bar track rail constitutes the lower runway for the balls 24, and, as shown is open at its outer side whereby to prevent lodgment of foreign matter which might otherwise impede the proper action of these members were they to run in a gutter, as has heretofore been proposed. This rail serves as a stiffening member for the doorway frame against which its vertical flange is secured, and being thus positioned little or no damage to the track can be done by teams backing up and impacting against it, or against the brackets. The latter being in turn secured to the flanges of the track are so firmly riveted and bolted that any unauthorized person seeking to gain entrance to the car would find it impossible to uncouple these brackets without removing the entire track, in which event the door would fall, since it is supported at the bottom. Such an outcome, it is thought, should have a deterring influence upon pilferage of this sort.

Spacing means for the balls is provided through the medium of an elongated spacer 39 which may take the form of a thin metal U-shaped channel, as shown, and which may also be terminally provided with rollers 40 positioned to anti-frictionally engage the balls and the track when the door is in motion. This spacer 39 may have a length at least equal to a fractional part greater than one-half the length of the door in order to gain the best results. When in motion the door travels freely twice the distance that is travelled by either one of the two balls. Consequently, with the balls and spacer relatively positioned as in Figure 4, the door will have maximum ease in opening movement until the left-hand end plate 41 overtakes the left-hand ball at a point located a short distance from and in advance of the right-hand door post 11, at which time the ball is interposed between said end plate and the left-hand roller 40 of the spacer 39. From this point on the travel of the door is checked or cushioned by the braking action of that ball already referred to and also by the right-hand ball which is then in contact with the right-hand roller of the spacer. This stated relation of the parts is such as to prevent slamming of the door, whether the latter is in process of opening by trainmen, or under involuntary movement incident to abrupt train movement. Furthermore, movement in a reverse direction to close the door is similarly checked and controlled, except that the position of the balls is reversed, as for example the right-hand ball is, at a similar point, removed from the left-hand door post 11, interposed between the right-hand roller of the spacer and the right-hand end plate 42. In other words, the door has its final opening and closing movement positively checked or cushioned to prevent damage being inflicted upon it or door frame stops, while it has absolute ease in movement from its full closed or open position across the major part of the doorway opening. This represents an important feature of my invention. And obviously so, as it is the common practice to employ the destructive crow-bar in opening car doors which so frequently bind or stick in the opening of the same. In the present instance only a slight push is required to start the door on its travel along the track, and once started it is under full control, the cushioning function being wholly automatic in character. On reaching the end of its travel in either direction, the brackets 32 engage the cams 31 and the door moves laterally a slight distance to come up flush with the doorway frame. Similar means for forcing the upper portion of the door up tight against the frame may be employed, and in this respect I provide the guide bracket 43, secured to the stop 12 to engage the outer front edge of the door, and dished out portions or cams 44 and 45 may be formed, respectively, on the vertical flange 17′ of the upper rail 17 and upon the upper door plate 46 to cooperate with this purpose in view, in either directional movement of the door. This plate 46 is secured to the upper door margin by means of the elements 47, and the track to the fascia 16 by the bolts 48. In its opening movement the door ultimately abuts and is engaged by the stop bracket 49, in addition to its cammed engagement at its upper and lower margins as above set forth.

Means are also provided whereby the door at the end of its opening and closing movements is automatically locked against involuntary movement under abrupt train movement. In the present instance each end plate, 41 and 42, is provided with a housing 50 in which a T-shaped door locking pin member 51 has vertical sliding movement, whereby, at the termination of the door movement it moves downwardly past either end of the door rail 26 to lock the door against reverse movement. In Figure 1 the right-hand member 51 is shown in door locking position, and the left-hand member is illustrated in its raised inoperative position with its shank resting on the runway surface 26′. In order to close the door the former member 51 is raised by the right hand of the trainman while his left hand grasps the hand hold 52 to impart movement to the door in the left-hand direction. During this movement the left-hand locking member rides idly along the track until the door closes, whereupon it drops to its operative locking position. Obviously this pin member may have its lower end slotted in the customary manner of sealing pins so as to receive the ordinary car door seal, as is suggested by the reference character 53 in Figure 9.

A condition frequently encountered in practice in respect to door opening movement results from a shifting of the load, or portions thereof, against the door to hinder this movement, and means now to be described are provided to assist in such movement. The reference character 54 designates an angle-bar whose vertical and upper flange is secured to the outer face of the lower portion of the door, said angle-bar being co-extensive with said face to serve as a stiffening member and being provided with a staple 55 to receive the free end of a hasp or latch 56. This latch is pivotally carried on the outer of the two articulated bars 57 and 58, the latter being pivoted on an angle-bar piece 59 and secured to the stop 12 and door post 11 by means of a headed bolt 60, and the former provided with an out-turned flange 61 apertured at 62, as is the latch nose at 63, to receive a second seal 64 if this should be desired. The parts are illustrated in their locked relation in Figure 9, and when thus positioned all stresses due to abrupt train movement and switching are widely distributed, and obviously so since the reinforcing metal extends from the outer side face of the stop 12 to the right-hand margin of the door. The bars 57 and 58 together constitute a lever, which, in opening the door, is moved to the position indicated in dotted lines in Figure 9 to engage an abutment 65 and being fulcrumed at 60 the door is given initial opening movement by an application of force at the free end of the long bar or arm 57. Similarly in order to close the door the lever may be swung upwardly on its pivot so that the outer end of arm 58 contacts with the lower abutment 66 with this aim in view.

The entire construction is simple in character and is economical in construction and maintenance. There are no involved parts, or parts capable of working loose, in point of fact, every element utilized in the fabrication of the door and its tracks are formed of wood or of commercial metal shapes, which, in case of damage may be very readily replaced or repaired. Other advantages will be apparent to those skilled in the art.

I claim:

1. In a railway box car, the combination with the doorway frame providing an opening, of a door adapted to have longitudinal sliding movement exteriorly of the doorway frame to close said opening and provided along its lower marginal portion with a channel, an open sided track for said lower door portion comprising an angle-bar rail member having its inner vertical flange abutting the doorway frame below the opening, anti-friction balls in said channel operatively interposed between said lower marginal door portion and the horizontal flange of said rail member, and a spacing member positioned loosely in said channel and constructed and arranged with reference to said balls and said door to check the final closing or opening movement of the latter.

2. In a railway box car, the combination with the doorway frame providing a opening, of a door adapted to have longitudinal sliding movement exteriorly of the doorway frame to close said opening and provided along its lower marginal portion with a channel, an open sided track for said lower door portion comprising an angle-bar rail member having its inner vertical flange abutting the doorway frame below the opening, anti-friction balls in said channel operatively interposed between said lower marginal door portion and the horizontal flange of said rail member, and an elongated U-shaped spacing member in said channel provided terminally with rollers adapted to contact with said track and having a length slightly greater than one-half the length of the door.

3. In a car, the combination with a doorway frame providing an opening, of a sliding door for closing said opening provided along its lower edge portion with a channel having closure members for closing the ends of said channel, a lower track for supporting said door, anti-friction balls in said channel adapted to roll along said track, and a spacing element in said channel interposed between said balls and having a length greater than one-half the distance between said closure members, all so constructed and arranged whereby the rate of door travel is checked near the limits of either of its directional movements.

4. The combination with an upstanding door having its lower edge longitudinally channeled, of a flat substantially horizontal track wider than the thickness of the door for said lower edge, means for guiding the upper portion of the door, balls of uniform diameter positioned in the channel and bearing upon the track; and a spacing member for said balls interposed in said channel to have a rolling contact with said track.

5. The combination with a car or the like provided with a door opening, of a door adapted to close said opening, a track disposed beneath said opening and upon which said door is carried, a plurality of balls disposed between said track and said door, and a floating spacer extending between said balls and adapted to travel relatively to said door and track, and means cooperating with said spacer to retard rotative movement of the anti-friction balls near the opening or closing position of the door to thereby check the final opening and closing of the door.

6. The combination with a door, of a track adapted to carry the weight of the door, anti-friction balls disposed between said door and track, means depending from the door for preventing escape of the balls from between said door and track, and a spacer adapted to travel relatively to both the door and the track to permit initial movement of the door with maximum ease and to check the final closing or opening movements of the door.

7. The combination with a door provided at its lower edge with a runway, a track disposed beneath said door and having a substantially flat upper surface extending parallel with said runway, anti-friction members adapted to travel in said runway upon said track, flanges depending from the door for preventing the escape of said members from said runway, and a spacing member disposed in said runway in position to maintain said anti-friction members in spaced relation, said spacing member being supported at spaced intervals so as to be free to travel with said anti-friction members longitudinally of and relatively to both said runway and said track.

8. The combination with a car or the like provided with a door opening, of a door adapted to close said opening, a track disposed beneath said opening and upon which said door is carried for movement edgewise, a plurality of balls disposed between said track and said door, and a floating spacer for said balls adapted to travel on the track relatively to said door and track, to permit initial movement of the door with maximum ease and to check the final closing or opening movements of the door.

9. The combination with a door, of a track adapted to carry the weight of the door, anti-friction balls disposed between said door and track, means for preventing escape of the balls from between said door and track, and a spacer between said balls and adapted to travel with said balls relatively to both the door and the track, and adapted to travel on the track.

10. The combination with a door provided on its lower edge with a longitudinally extending bearing member, a substantially horizontal track beneath the door presenting a bearing surface opposed to said bearing member, means for guiding the upper portion of the door, a plurality of door supporting balls interposed between said track and said bearing member, and a spacing member for holding said balls apart, said spacing member being antifrictionally supported to float upon said track.

11. The combination with a wall provided with a door opening, of a door adapted to close said opening, a track disposed adjacent said opening and upon which the door is carried for sliding movement, a plurality of balls disposed between the track and said door, and means for retarding the movement of the balls when the door is near its full open or closed position to thereby check the final opening or closing of the door.

12. The combination with a wall provided with a door opening, of a door adapted to close said opening, a track disposed beneath said opening and upon which said door is carried for sliding movement, a plurality of balls disposed between said track and door, and means associated with said sliding door for retarding the rotative movement of the balls to thereby permit the initial movement of the door with maximum ease and to check the final closing or opening movements of the door.

13. The combination with a car provided with a door opening, of a door adapted to close said opening, a track disposed beneath opening and upon which said door is carried for sliding movement, a plurality of balls disposed between said track and door, a floating spacer for said balls adapted to travel on the track relative to the door and track, and means associated with the door for cooperating with the spacer to retard the rotative movement of the balls, near the full opening or closing movement of the door, whereby to permit initial movement of the door with maximum ease and to check the final closing or opening movement of the door.

14. The combination with a wall provided with a door opening, of a door adapted to close said opening, a track disposed beneath said opening and upon which said door is carried for sliding movement, a plurality of balls disposed between said track and said door, and a floating spacer for said balls adapted to travel on the track relatively to said door and track, said spacer being provided with supporting devices for engaging the track, and means cooperating with the supporting devices for retarding the rotative movement of the balls near the full opening or closing position of the door whereby to permit initial movement of the door with maximum ease and to check the final closing or opening movements of the door.

15. The combination with a car wall provided with a door opening, of a door adapted to close said opening, a track disposed beneath said opening and upon which said door is carried for sliding movement, a plurality of balls disposed between said track and said door, means for retarding the rotative movement of the balls when the door is near its full opening or closing position to thereby check the final movements of the door, and means for laterally moving the door on said track when the door reaches its full opening or closing position.

16. The combination with a car provided with a door opening, of a door adapted to close said opening, a track disposed beneath said opening and upon which said door is carried for sliding movement, a plurality of balls disposed between said track and said door, means for retarding the rotative movement of the balls when the door is near its full opening or closing position to thereby check the final movements of the door, means for laterally moving the door on said track when the door reaches its full opening or closing position, and locking devices for positively maintaining the door in its closed position.

17. The combination with a car provided with a door opening, of a door adapted to close said opening, a track disposed beneath said opening and upon which said door is carried for sliding movement, a plurality of balls disposed between said track and said door, and means for progressively retarding the rotative movement of said balls when the door approaches its full opening or closing position to thereby check the final opening or closing movements of the door.

18. The combination with a car provided with a door opening, of a door adapted to close said opening, a track disposed beneath said opening and upon which said door is carried for sliding movement, a plurality of balls disposed between said track and said door, a floating spacer positioned between said balls and permitting independent sliding movement of said balls relative to said spacer, and means for retarding the movement of said balls when the door approaches its final opening or closing positions to thereby check the movement of the door during the final opening or closing positions.

19. The combination with a car provided with a door opening, of a door adapted to close said opening, a track disposed beneath said opening and upon which said door is carried for sliding movement, a plurality of anti-friction bearings disposed between said track and said door, a floating spacer of substantially U-shaped formation adapted to travel on the track relative to the door and track, rollers mounted within said U-shaped spacer for slidably supporting the spacer on said track, and means for forcing the anti-friction bearings against said rollers when the door approaches its full opening or closing position to thereby check the final movements of the door.

FRANK JAGER.